US008407157B2

(12) United States Patent
 Anderson

(10) Patent No.: US 8,407,157 B2
(45) Date of Patent: Mar. 26, 2013

(54) LOCATING HARVESTED MATERIAL WITHIN A WORK AREA

(75) Inventor: Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 3785 days.

(21) Appl. No.: 10/743,587

(22) Filed: Dec. 22, 2003

(65) Prior Publication Data

US 2005/0197175 A1    Sep. 8, 2005

(51) Int. Cl.
 *G06F 17/00* (2006.01)
 *G06F 7/70* (2006.01)

(52) U.S. Cl. .......................................... 705/500; 701/50
(58) Field of Classification Search .............. 705/1, 500; 701/50
See application file for complete search history.

(56) References Cited

U.S. PATENT DOCUMENTS

| 4,950,118 | A | * | 8/1990 | Mueller et al. | ................ 414/274 |
| 5,369,588 | A | * | 11/1994 | Hayami et al. | ........... 340/995.19 |
| 5,712,782 | A | * | 1/1998 | Weigelt et al. | .................. 701/50 |

FOREIGN PATENT DOCUMENTS

| DE | 43 21 754 A1 | | 2/1995 |
| WO | WO 00/35265 | | 6/2000 |
| WO | WO0035265 | * | 6/2000 |

* cited by examiner

*Primary Examiner* — Gerardo Araque, Jr.
*Assistant Examiner* — Paul R Fisher
(74) *Attorney, Agent, or Firm* — Yee & Associates, P.C.; Anand Gupta

(57) ABSTRACT

A method and system for locating harvested material comprises receiving material data including material location data on a material location of harvested material within a work area. Background data is obtained. A location-determining receiver determines a forwarder location of a forwarder. An estimator estimates economic cost factors associated with corresponding candidate paths or segments of candidate paths between the forwarder location and the material location. A selector selects a preferential planned path between the forwarder location and the material location consistent with the material data, background data, and minimization of the economic cost factors.

29 Claims, 9 Drawing Sheets

LOCATING HARVESTED MATERIAL WITHIN A WORK AREA

FIELD OF THE INVENTION

This invention relates to a method and system for locating harvested material within a work area.

BACKGROUND OF THE INVENTION

In the prior art, a harvester may place harvested material at geographic locations within a work area. An operator of a forwarder may locate the harvested material through trial and error, intuition, or past experience. To the extent that the operator of a forwarder discovers the harvested material after one or more unsuccessful attempts to find the harvested material, the power consumption and efficiency of the forwarder is reduced with respect to the optimal case of making only successful attempts.

For example, when an operator of a log forwarder comes to a worksite, the operator may not know where logs are located for pick up. As a result, the operator may visually identify the log piles by experimentally developing routes through a forest or wooded region on an ad hoc basis. The informal development of routes for the forwarder with incomplete information leads to inefficient equipment use and the risk of encountering hazards or impassible areas (e.g., swamps), where the forwarder needs to revise or retrace its path. Thus, a need exists for an enhanced method and system for locating harvested material within a work area.

SUMMARY OF THE INVENTION

A method and system for locating harvested material comprises receiving material data including material location data on a material location of harvested material within a work area. Background data associated with the work area is obtained. A location-determining receiver determines a forwarder location of a forwarder. An estimator estimates economic cost factors associated with corresponding candidate paths or segments of candidate paths between the forwarder location and the material location. A selector selects a preferential planned path between the forwarder location and the material location consistent with the background data and minimization of the economic cost factors.

DESCRIPTION OF THE PREFERRED EMBODIMENT

Figure 1:
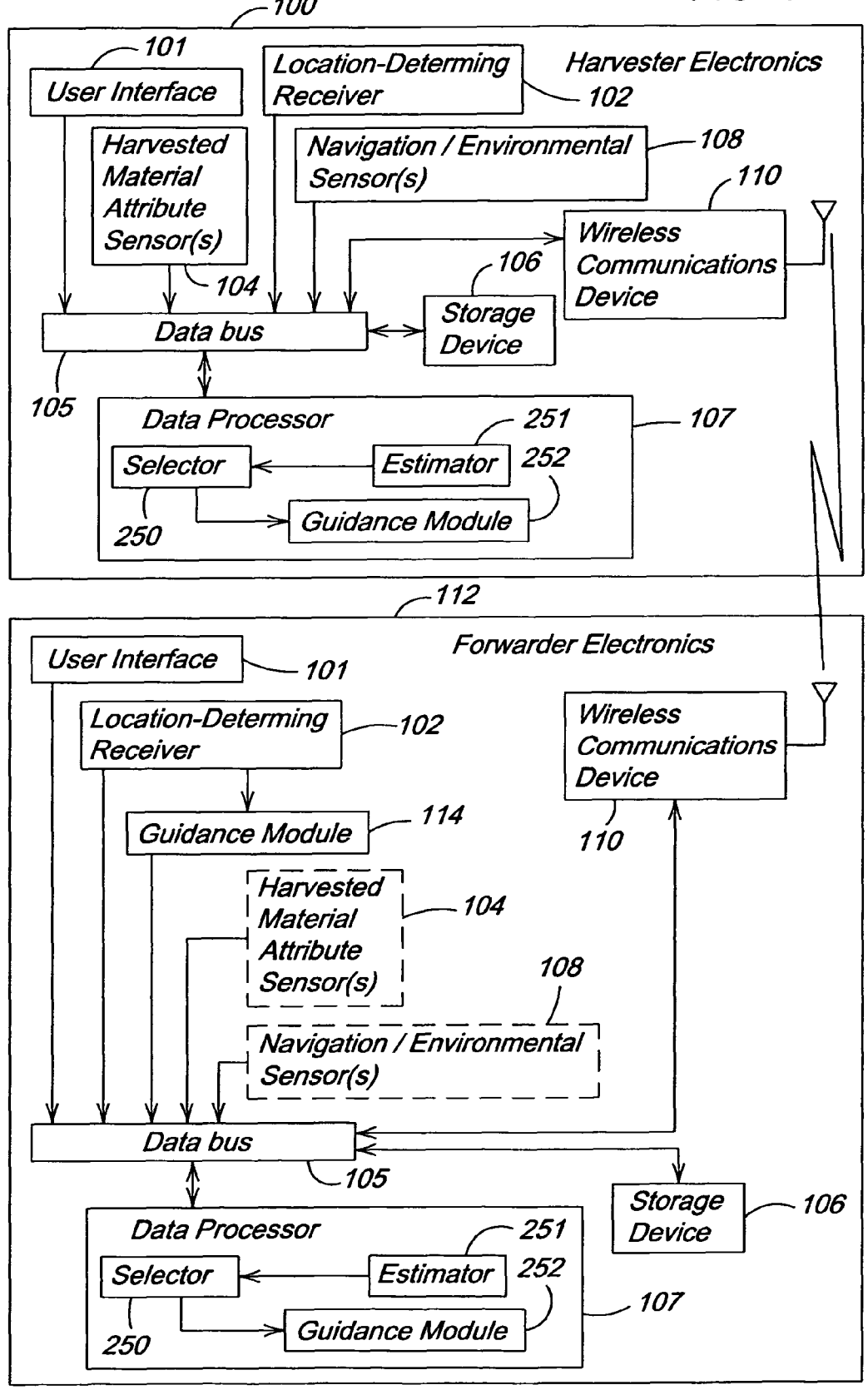
FIG. 1 is a block diagram of one embodiment of harvester electronics and forwarder electronics that supports locating harvested material within a work area.

In FIG. 1, harvester electronics 100 communicates data to forwarder electronics 112 via an electromagnetic signal (e.g., radio frequency signal). In the embodiment illustrated in FIG. 1, the harvester electronics 100 comprises a user interface 101, a location-determining receiver 102, one or more harvested material attribute sensors 104, one or more navigation/environmental sensors 108, a storage device 106, a data processor 107, and a wireless communications device 110 that communicate to one another via a databus 105.

The data processor 107 comprises a selector 250, an estimator 251, and a guidance module 252. An estimator 251 is coupled to the selector 250. In turn, the selector 250 is coupled to the guidance module 252.

In the embodiment illustrated in FIG. 1, the forwarder electronics 112 comprises a user interface 101, a location-determining receiver 102, a guidance module 114, a storage device 106, a data processor 107, and a wireless communications device 110 that communicate with one another via a databus 105.

Certain components of the forwarder electronics 112 are optional, as indicated by dashed lines. The optional components of the forwarder electronics include one or more harvested material attribute sensors 104 and one or more navigational/environmental sensors 108. If the harvested material attribute sensor 104 is present, the harvested material attribute sensor 104 may be coupled to the databus 105. Similarly, if the navigational/environmental sensor 108 is present, the navigational/environmental sensor may be coupled to databus 105.

For the harvester electronics 100, the location-determining receiver 102 provides harvester location data and material location data to the data processor 107, the storage device 106, or both. The harvester location is highly correlated to the material location approximately when the harvester drops off or releases a load or another unit of harvested material. The harvester electronics 100 may be triggered to record material location data outputted by the location-determining receiver 102 generally contemporaneously with a release or an unloading of a load or another unit of harvested material from the harvester.

The harvested material attribute sensor 104 senses or acquires material data, ancillary material data or both or the user may input material data via the user interface 101. The harvested material attribute sensor 104 may execute measurements, conduct tests or take samples of the harvested material during harvesting to acquire material data, for example. In one embodiment, a harvested material attribute sensor 104 comprises an optical transmitter and sensor that senses reflected optical transmissions from the harvested material to distinguish one harvested material from another (e.g., one wood species from another, such as white pine from red oak).

Material data and ancillary material data are associated with the harvested material. Material data comprises a material identifier and corresponding material location data for the material identifier. A material identifier may represent a wood species or variety, a tree type, a crop identifier, a grain identifier, a corn descriptor, a hay identifier, a forage identifier or the like. Ancillary material data includes material attributes on the harvested material. For example, material attributes on harvested material may include any of the following: moisture content, protein content, oil content, starch content, sugar content, density, dimensions (e.g.,length), and weight.

The navigation/environmental sensors 108 may detect background data associated with the work area or the user may input background data via a user interface 101. Background data includes static data, transient data or both on the environment of the work area. Transient data may vary over a short period of time (e.g., within a day, minutes or seconds), whereas background data may remain static or relatively constant over a longer period of time (e.g., weeks or years). Background data may include any of the following: obstacle descriptors and corresponding obstacle location data; obstruction descriptors and corresponding obstruction location data; hazard descriptors and corresponding hazard location data; harvested area identifier and corresponding harvested area location data; unharvested area identifier and corresponding unharvested area location data; transportation route data and respective transportation route location data; path segment data and respective path segment location data; drop-off identifier and corresponding drop-off location data.

In the harvester electronics 100, the harvested material attribute sensor 104 and the navigation/environmental sensors may store data (e.g., material data and background data) in the storage device 106. In turn, the wireless communications device 110 of the harvester electronics 100 may transmit the stored information to the wireless communications device 110 of the forwarder electronics 112. In one embodiment, the wireless communications devices 110 harvester electronics 100 and the forwarder electronics 112 may communicate directly via an electromagnetic signal. In another embodiment, the wireless communications devices 110 may communicate via a relay, a repeater station, a terrestrial intermediary, an orbiting intermediaries, wireless radio infrastructure, a cell site or a communications satellite.

The data processor 107 of the forwarder electronics 112 develops a preferential path plan for the forwarder (a) from the forwarder location to the harvested material location and/or (b) from the material location to a drop-off area for the harvested material. The composite preferential path plan or composite path refers to the combination of one or more primary path segments from the forwarder location to the harvested material location and a secondary path segment from the material location to the drop-off area for the harvested material. The data processor 107 develops the preferential path plan based upon one or more of the following types of data: material data, environmental data or economic cost factors associated with available path segments.

The user interface 101 may include one or more of the following: a display, a keypad, a keyboard, a pointing device, a graphical user interface, a magnetic storage device, an optical storage device, an optical medium reader, and a magnetic medium reader. In one embodiment, the forwarder electronics 112 has a location-determining 102 receiver for locating itself on a map. The map may be displayed to the operator of a forwarder using a visual display (e.g., a cathode ray tube or a liquid crystal display) associated with the user interface 101. The map display may include background map information such as found on the United States Geological Survey maps or other publicly available sources, including ground cover and topography. Maps or map data from publicly available sources, such as universities, state governments, federal governments, governmental agencies, and department of natural resources or conservation may provide a database and/or representation on the locations, definitions, description, attributes of crops, vegetation, plants or trees of a particular work area which yield harvested material. The displayed map may have pan and zoom capabilities typically used with electronic maps (e.g. map software commonly available for personal computers). The user may also select which types of features (e.g, layers) to display.

The user interface 101 may supplement, complement, replace or obviate the function of the material attribute sensors 104 in acquiring material attribute data. The user interface 101 supports an operator's manual entry, audio entry or keyboard entry of any of the following: material data, material location data, material attributes, and ancillary material data. For example, an operator of the harvester may enter material attributes (e.g., wood species and dimensions) of harvested material via the user interface 101, instead of relying on material attribute sensors 104 to provide such data. The operator or a technical may observe the harvested material or conduct other tests to derive or verify material data. Further, the operator may enter material data to override readings of the material attribute sensors 104 to correct for inaccuracies or deficiencies in the material attribute sensors 104.

Figure 2:
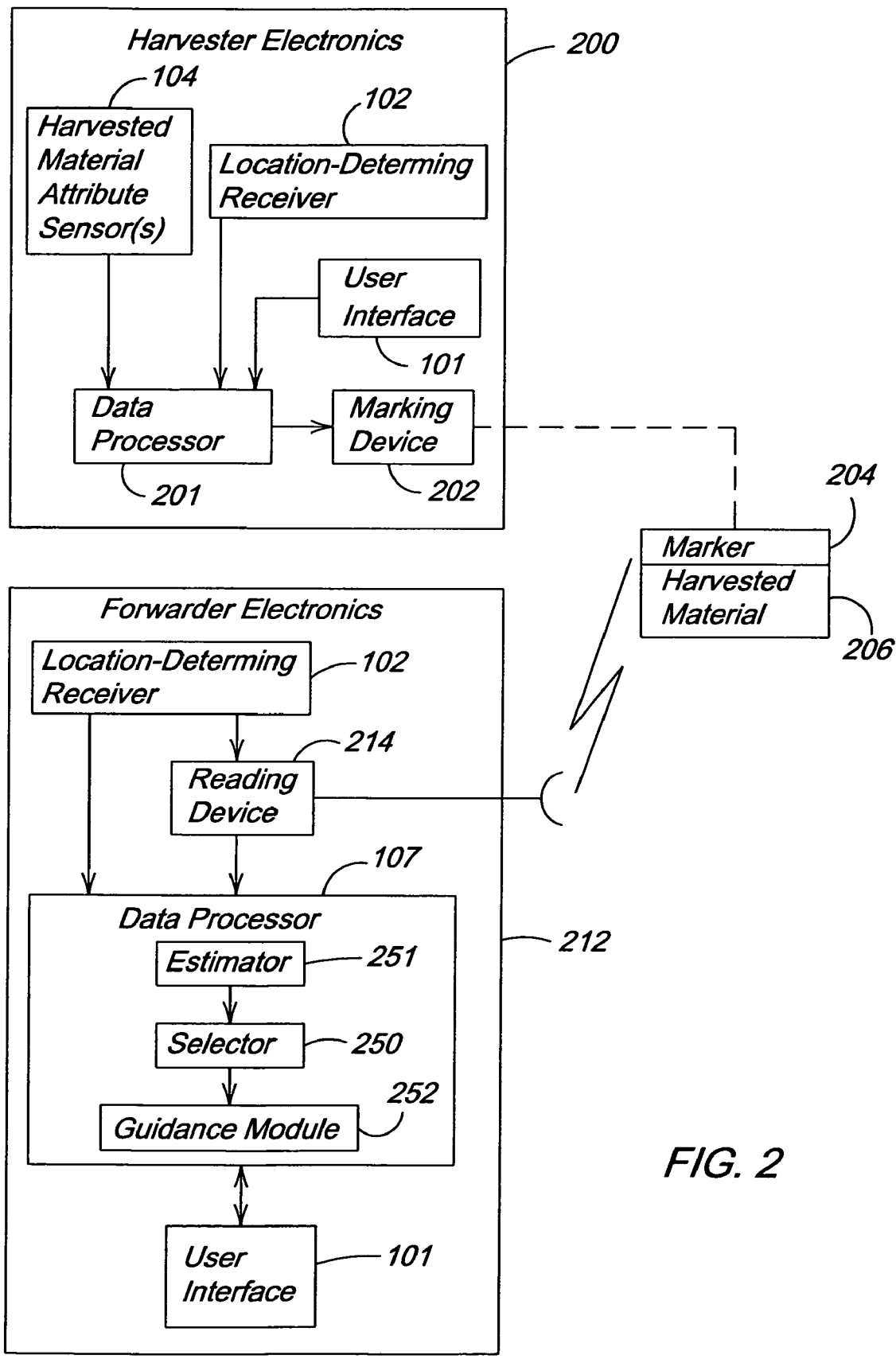
FIG. 2 is a block diagram of another embodiment of harvester electronics and forwarder electronics that supports locating harvested material within a work area.

FIG. 2 is an alternate embodiment of harvester electronics 200 and forwarder electronics 212. Like reference numbers in FIG. 1 and FIG. 2 indicate like elements.

The harvester electronics 200 of FIG. 2 comprises a location-determining receiver 102, a user interface 101, and a harvested material attribute sensor 104 that are coupled to or provide data to a data processor 201. In turn, the data processor 201 is coupled to a marking device 202. The operator can enter material attributes (e.g., tree attributes) from a user interface 101 instead of, or in addition to, using material attribute sensors 104.

The marking device 202 is arranged for marking harvested material 206 with a marker 204. For instance, the marking device 202 may comprise a label maker, a bar code label maker, a printer, a computer for programming or configuring a radio frequency identification tag or otherwise. The marker 204 may comprise a bar code, a Uniform Product Code (UPC), an optical code, a radio frequency identification tag, an optical tag or another tag. The marker 204 may store at least one of material data, a material identifier, material location data, and ancillary material data as stored data. An optical tag may be coded in accordance with the humanly visible spectrum to allow different material attributes to be associated with corresponding unique colors.

The forwarder electronics 212 of FIG. 2 comprises a location-determining receiver 102 coupled to a reading device 214 for reading the marker 204 on or associated with the harvested material 206 to retrieve the stored data. In turn, the reading device 214 is coupled to a data processor 107 for processing the retrieved stored data. For example, if the operator of the forwarder requires harvested material with a certain value, range, a maximum value or a minimum value of a material attribute, the forwarder electronics 212 may read the marker 204 to determine whether the harvested material is compliant with the requisite value of a material attribute. The user interface 101 may provide input to or display output data on the stored data retrieved from reading the marker 204.

If the marker comprises an RFID tag, the forwarder electronics 212 may collect the stored information from marker 204 if the reading device 214 is within the reception range of a transmission from the RFID tag. In one embodiment, the reading device 214 may transmit an electromagnetic signal (e.g, an interrogation signal or coded signal) to the RFID tag which triggers a response of the RFID tag when the electromagnetic signal is received at or above a noise level threshold of reception. For example, the stored information of the marker 204 may include a material identifier and a corresponding material location which enables the data processor 107 of the forwarder electronics 212 to determine a preferential path of the forwarder from a forwarder location to a material location and from one or more material locations to one or more drop-off locations.

If the marker comprises an optically readable tag, the forwarder electronics 212 needs to be moved in close proximity to the marker 204 for reliable reading. Accordingly, the harvester electronics 200 may mark a duplicate tag that is not attached to the harvested material, but instead physically brought to the reading device 214 of the forwarder electronics 212 to communicate the stored information to the forwarder electronics 212. For example, the stored information of the marker 204 and the duplicate tag may include a material identifier and a corresponding material location which enables the data processor 107 of the forwarder electronics 212 to determine a preferential path of the forwarder from a forwarder location to a material location and from one or more material locations to one or more drop-off locations. The preferential path or composite preferential path may be displayed to an operator of the forwarder electronics 212 via a user interface 101.

Figure 3:
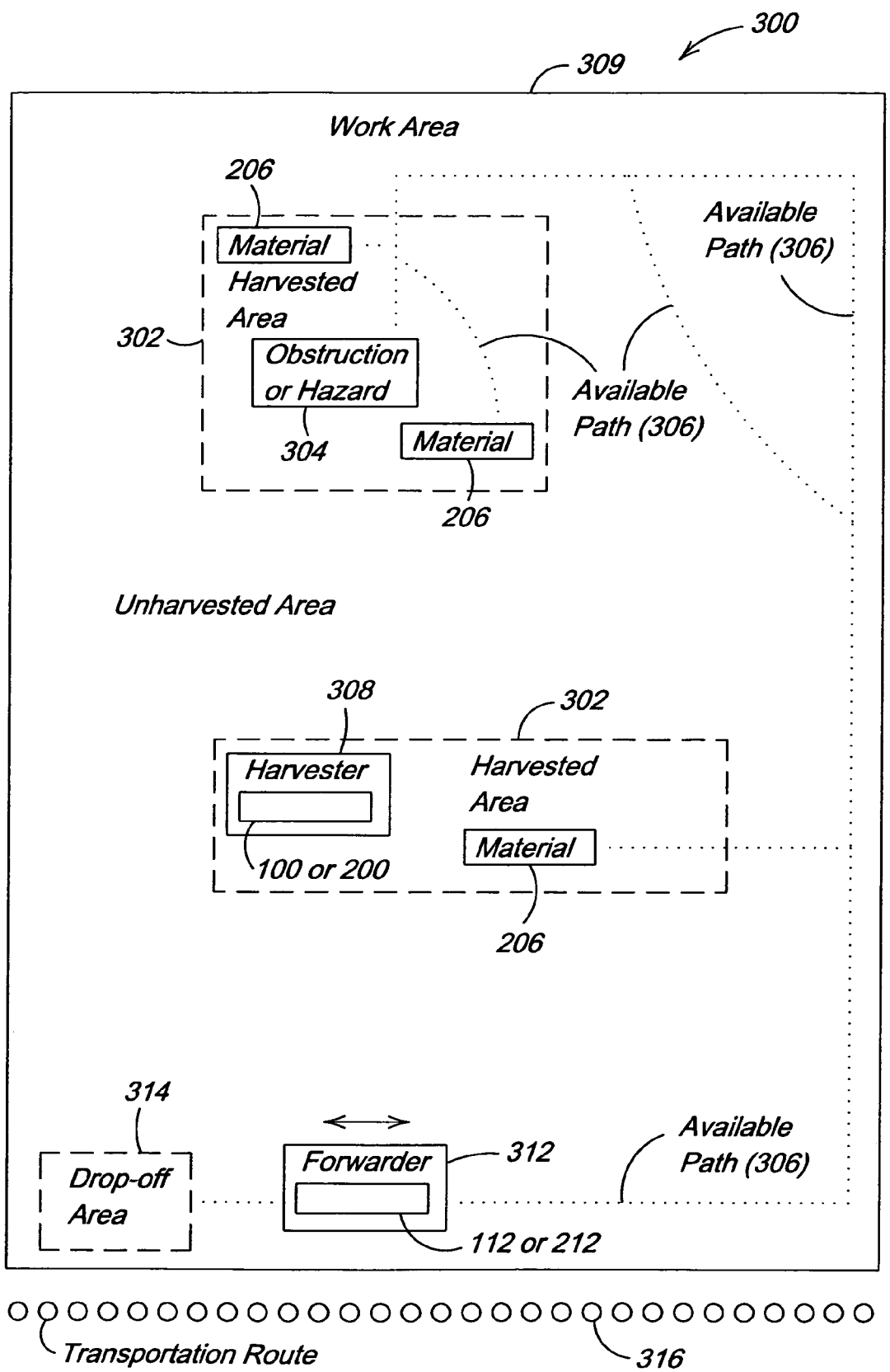
FIG. 3 is a block diagram of a top view of an illustrative work area in accordance with the invention.

FIG. 3 shows a block diagram of an illustrative work area 300 in which a harvester 308, equipped with harvester electronics (100 or 200), and a forwarder 312, equipped with forwarder electronics (112 or 212), are used. The work area 300 may include harvested areas 302 and unharvested areas 309. That portion of the work area 300 other than the harvested area(s) 302 forms the unharvested area 309. Further, over time a portion or all of the unharvested area 309 may be transformed into a harvested area 302 through the activity of the harvester 308. The work area 300 may include one or more obstructions 304 or hazards. Although the obstructions 304 or hazards are shown in the harvested area 302 as illustrated in FIG. 3, the obstructions 304 and hazards may be located in any region of the work area 300. The work area 309 may represent an area of timberland or a field in which any harvested material is grown, for example.

The harvester 308 harvests harvested material 206 and drops off or deposits the harvested material 206 at corresponding material locations. Harvested material 206 may be located in the harvested area 302 or elsewhere for later pick-up by a forwarder 312. The forwarder 312 moves along one or more available paths 306 to reach the harvested material 206. The available paths 306 are indicated by dotted lines shown in FIG. 3. In one embodiment, the available paths 306 of FIG. 3 are representative of a work area 300 in a timberland or another area that has considerable limitations in terrain, natural obstacles or man-made obstacles. In another embodiment, the available paths 306 of FIG. 3 may represent a relatively open field where it is desired to limit soil compaction that might otherwise be caused by allowing wide-spread movement of work vehicles in the work area.

In an alternate embodiment, available paths may represent entire regions (e.g., geographical areas) in which one or many alternate paths may exist. For example, where harvested material is hay or foraging material deposited in a field with few natural or man-made obstacles, the number of available paths may be very large.

The forwarder 312 picks up and transports appropriate harvested material 206 from one or more material locations to one or more designated drop-off areas 314. Each drop-off area 314 may be convenient to a transportation route 316, such as a highway, a road, a railway line, an airport, a port or the like. The transportation route 316 is indicated by an array of circles as shown in FIG. 3.

In one embodiment, the physical boundaries, obstacles, obstructions, paths, and transportation routes of the work area 300 of FIG. 3 may be stored as background data. The background data may be displayed to a user of a forwarder on a map of the work area 300 via a user interface 101.

The background data may be used by the data processor (.e.g., 107 or 201) for determination of a preferential path plan or composite preferential path of the forwarder 312 through the work area 300. A preferential path among all of the available paths is selected for (a) movement of the forwarder 312 from a starting forwarder location to a material location and (b) transportation of material 206 from the material location to the drop off area 314. The preferential path takes into account background data, material data, economic factors, environmental factors, and vehicle dynamic constraints associated with candidate paths or candidate path segments. Environmental factors may relate to path selection for reduction of soil compaction from the forwarder and/or rutting from the wheels or tracks of the forwarder. Environmental factors may relate to avoiding steep terrain, cliffs, ravines, pits, swamps, lakes, rivers, waterways or other natural or man-made obstacles or hazards. Vehicle dynamic constraints relate to the handling and maneuvering capabilities of a forwarder that is transporting a certain corresponding level of a load of the harvested material. The handling and maneuvering capabilities may vary with a full or partial load or empty state of forwarder. For example, an empty forwarder may traverse a steeper slope than a fully loaded forwarder. The available paths may be restricted to known path segments that are established by scouting or observations of the forwarder 312, the harvester 308, or both when traveling through the work area 300.

In an alternate embodiment, the available paths and background data are established via survey of the work area 300. The survey results may be inputted via a keyboard, an optical reading device, a magnetic reading device or another input/output device. The survey may be conducted via a cruiser (e.g., a person or an instrumented vehicle or aircraft) that inspects timberland, for instance.

Figure 4:
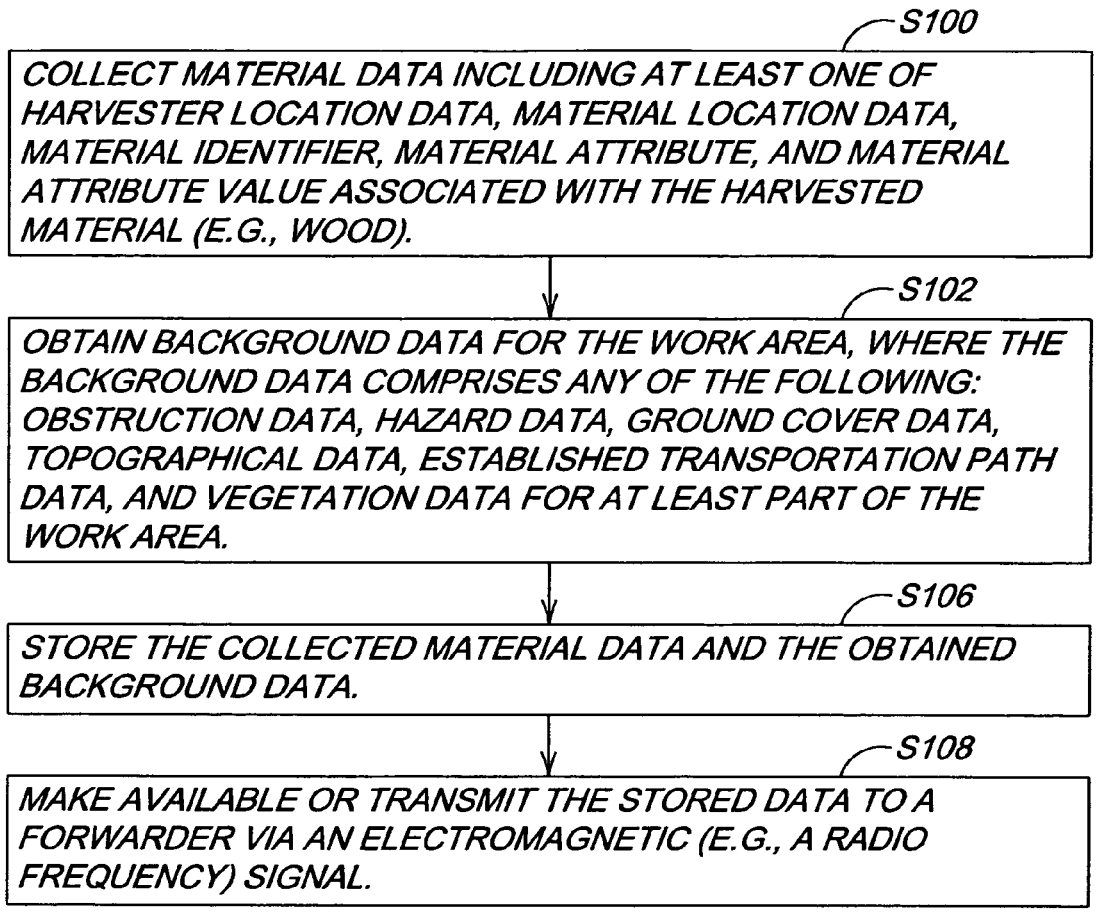
FIG. 4 is a flow chart of a method for gathering input data associated with the formation of a preferential path plan.

FIG. 4 illustrates a method for collecting input data for determination of a preferential path plan. The method of FIG. 4 begins in step S100.

In step S100, harvester electronics (100 or 200) collects material data including at least one of a material identifier, material location data, ancillary material data, a material attribute, and material attribute value. For example, harvester electronics (100 or 200) may gather a material identifier that is associated with corresponding material location data. Harvester location data may be estimated to be the equivalent of material location data where the harvester and the material are located together.

In one configuration, the material attribute sensors 104 may measure, detect or analyze the material to determine a material attribute, a material attribute value, or both. For example, material attribute may comprise a moisture content and the material attribute value may be the range of measured moisture content of the material.

In step S102, harvester electronics (100 or 200) obtains background data for the work area. The background data comprises any of the following: obstruction data and corresponding obstruction location data; hazard data and corresponding hazard location data; obstacle data and corresponding obstacle location data; ground cover data, ground cover identifier and corresponding location data; topographical data; established transportation path data, drop-off location identifier and drop-off location data, vegetation data, unharvested area identifier and unharvested area location data, and harvested area identifier and harvested area location data. The background data may be obtained via one or more of the following: a location-determining receiver 102, a harvested material attribute sensor 104, and a navigational environmental sensor 108; a commercially available database, a governmental database, a topographical database, and a survey of the work area. The user may input that background data via a user interface 101 associated with the harvester electronics (100 or 200).

Step S102 may be carried out in accordance with various alternatives. In accordance with a first alternative, the background data represents static data that does not change or is not likely to change over a greater sample period. In accordance with a second alterative, the background data includes both static data and transient data for the work area, where the background data remains constant over a greater sample period and the transient data tends to vary over the greater sample period. Changes in the transient data may be detected if samples are taken over a lesser sample period, which is of less duration (or greater frequency) than the greater sample period.

The transient data comprises any of the following: harvested area definition, one or more machine locations, one or more worker locations, one or more free-space area definitions, and time-stamps of corresponding transient data. The transient data may be obtained via one or more of the following: a location-determining receiver 102, a harvested material attribute sensor 104, a navigational environmental sensor 108, and a real-time or current survey of the work area.

In step S106, a storage device 106 or the harvester electronics (100 or 200) stores collected material data and obtained background data. During or prior to step S106, the data processor 107 may format, compress, organize, correlate or otherwise process data collected in steps S100 and S104.

In step S108, a wireless communications device 110 or the harvester electronics (100 or 200) makes available or transmits the stored data to a forwarder (with forwarder electronics (112 or 212)) via an electromagnetic (e.g., radio frequency) signal. After step S108, the forwarder electronics (112 or 212) may process the stored data (e.g., material data and background data) to determine a preferential path plan for the forwarder to travel from a current forwarder location to a material location and from the material location to a drop-off location as described in more detail later in this document.

Figure 5:
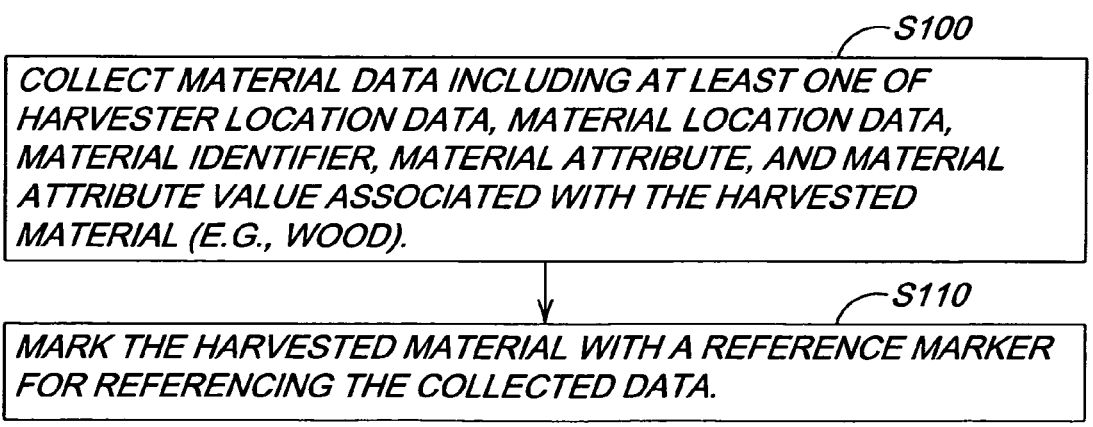
FIG. 5 is a flow chart of an alternate method for gathering input data associated with the formation of a preferential path plan.

FIG. 5 is a flow chart of an alternate embodiment of a method for collecting input data for determination of a preferential path plan. The method of FIG. 5 begins in step S100, which is identical to the step S100 of FIG. 4.

After step S100, the method of FIG. 5 continues with step S110. In step S110, a marking device 202 marks or tags the harvested material with a marker 204 for referencing the collected material data. Step S110 may be executed in accordance with various cumulative or alternate techniques. In accordance with a first technique, the marker 204 may indicate a storage location where additional information on the particular harvested material, associated with the corresponding marker 204, is stored in a computer, database, file or otherwise.

In accordance with a second technique for executing step S110, the marking device 202 may place an RFID tag on or near the harvested material, and the RFID tag may include data storage or memory for storing the collected material data. Further, the RFID tag may be arranged to transmit the collected material data from the RFID tag to a reading device 214 or reader associated with forwarder electronics 212.

In accordance with a third technique for executing step S110, the marking device 202 marks an optical, magnetic, paper or other storage medium to store the collected material data. One marker 204 is physically associated with the harvested material 206 and a duplicate marker (not shown) is held by the harvester for later delivery or provision to the forwarder electronics 212. The duplicate marker is presented to the forwarder electronics 212 for reading by the reading device 214. For example, the duplicate marker is presented to the forwarder electronics 212 when the harvester electronics 200 and the forwarder electronics 212 are in close proximity or meet to support the forwarder's development of a preferential path plan using the collected material data.

Figure 6:
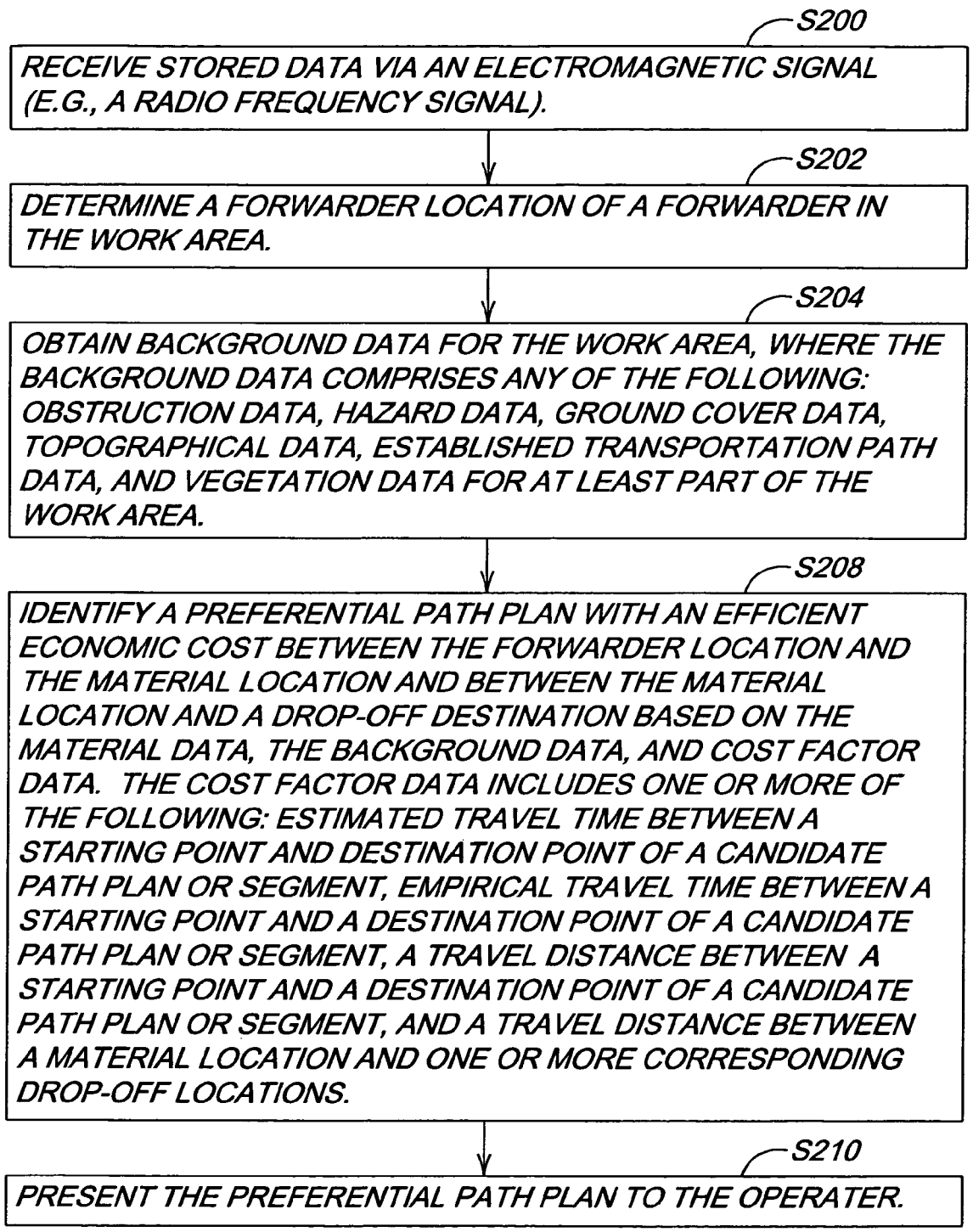
FIG. 6 is a flow chart of a method for determining a preferential path plan for a work vehicle, such as a forwarder.

FIG. 6 is a flow chart of a method for determining a preferential path plan of a forwarder or another work vehicle that transports harvested materials from an origination location (e.g., material location) to a destination location (e.g., drop-off area or location). The method of FIG. 6 starts with step S200.

In step S200, a wireless communications device 110 associated with forwarder electronics (112 or 212) receives stored data via an electromagnetic signal (e.g., a radio frequency signal). The stored data may represent stored material data and stored background data that was collected pursuant to the method of FIG. 4, for example. Accordingly, the method of FIG. 6 may be executed, but need not be executed, after completion of the method of FIG. 4.

In step S202, a location-determining receiver 102 determines a forwarder location of a corresponding forwarder in the work area. For instance, the location-determining receiver 102 may determine the present or instantaneous location of the forwarder as the forwarder progresses within or around the work area.

In step S204, background data for the work area is obtained. The background data may be obtained from sensors or inputs to the harvester electronics 100, sensors or inputs from the forwarder electronics 112, or both. In particular, the background data may be obtained via one or more of the following: a location-determining receiver 102, a harvested material attribute sensor 104, and a navigational environmental sensor 108. The user may input background data via a user interface 101, and such inputted background data may come from a commercially available database, a governmental database, a topographical database, and/or a survey of the work area.

The background data comprises any of the following: obstruction data and corresponding obstruction location data; hazard data and corresponding hazard location data; obstacle data and corresponding obstacle location data; ground cover data, ground cover identifier, and corresponding location data; topographical data; established transportation path data, drop-off location identifier and drop-off location data, vegetation data, unharvested area identifier and unharvested area location data, and harvested area identifier and harvested area location data. The background data may include static data, transient data or both, as previously described in conjunction with FIG. 4.

In step S208, a data processor 107 identifies a preferential path plan with an efficient economic cost between the forwarder location and the material location and between the material location and a drop-off area based on material data, background data, and cost factor data. The cost factor data includes one or more of the following: estimated travel time between a starting point and a destination point of a candidate path plan or segment, empirical travel time between a starting point and a destination point of a candidate path plan or segment, a travel distance between a starting point and a destination point of a candidate path plan or segment, and a travel distance between a material location and one or more corresponding drop-off locations. Accordingly, the forwarder is able to forward the harvested material from a known material location to the drop-off location in an efficient pre-defined manner in accordance with the preferential path plan.

Although step S208 uses economic cost factors, other embodiments may apply environmental factors and vehicle dynamic constraints. Environmental factors may relate to path selection for reduction of soil compaction from the forwarder and/or rutting from the wheels or tracks of the forwarder. Environmental factors may relate to the path of the forwarder avoiding steep terrain, cliffs, ravines, pits, swamps, lakes, rivers, waterways or other natural or man-made obstacles or hazards. Vehicle dynamic constraints relate to the handling and maneuvering capabilities of a forwarder that is transporting a certain corresponding level of a load of the harvested material.

In step S210, the user interface 101 may present the preferential path plan (e.g., a recommended route for the forwarder) to an operator. For example, the user interface 101 may present a driving directional indicator (e.g., arrow to indicate direction in which to steer a forwarder), a map display, audio or verbal driving commands by a speech synthesizer, a light bar or other means to direct the steering of forwarder or another applicable work vehicle. There may also be an audio, visual or haptic alert mechanism for alerting the operator that a log loading site is being approached. This alerting mechanism may have an adjustable range for the alert (e.g., within 10 or 20 feet of the stop) and its intensity (e.g., volume, brightness, firmness, etc.).

Figure 7:
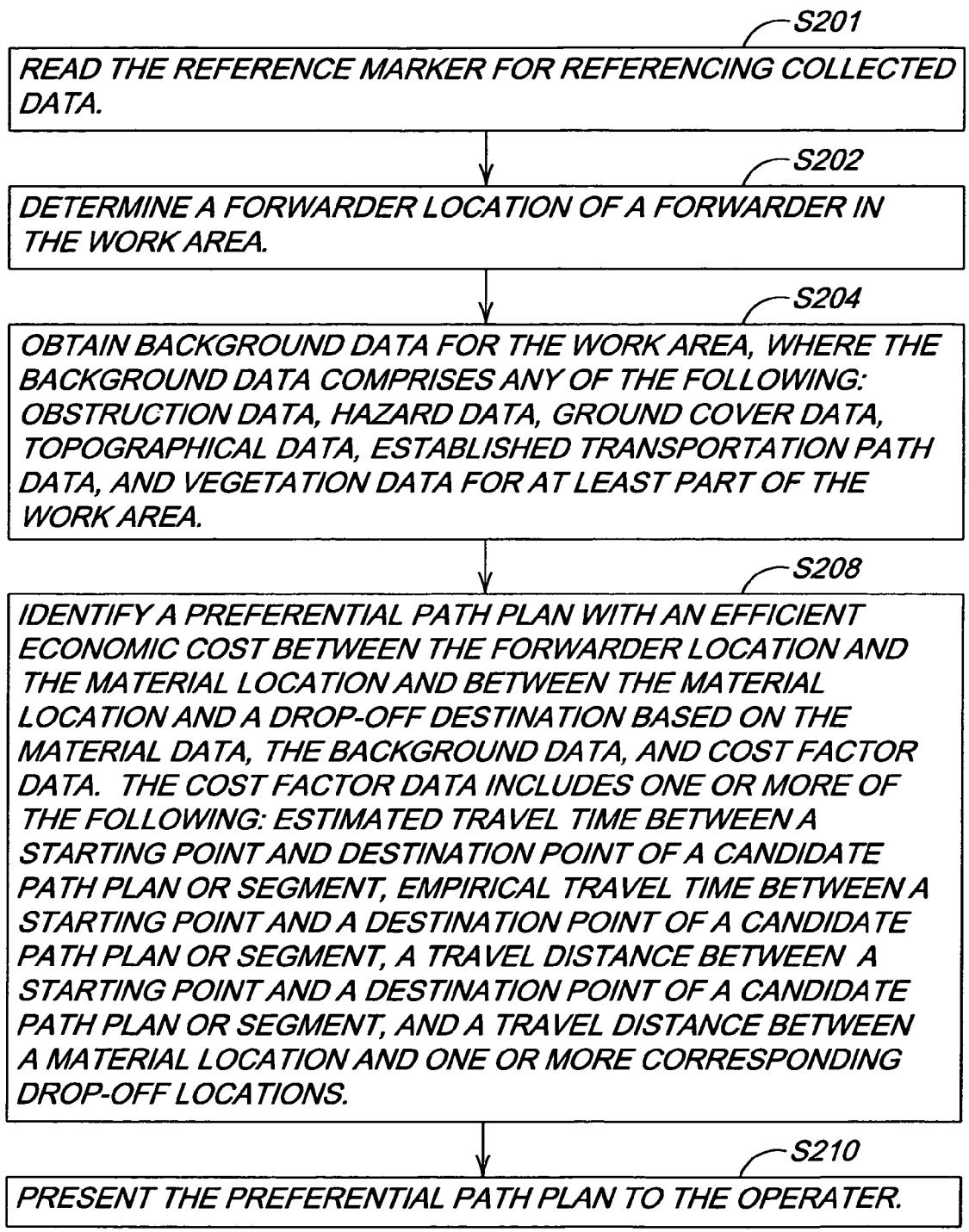
FIG. 7 is a flow chart of an alternate method for determining a preferential path plan.

The method of FIG. 7 is similar to the method of FIG. 6, except the method of FIG. 7 replaces step S200 with step S201. Like reference numbers in FIG. 6 and FIG. 7 indicate like elements.

In step S201, a reader or reading device 214, associated with the forwarder electronics (212), reads a marker 204 or a duplicate marker (not shown) for referencing collected or stored data. The collected or stored data may comprise material data, background data or other data collected by a harvester during operation of the harvester, data collected during a survey from a scouting work vehicle, and data collected from flights of aircraft or satellites over the work area, for example.

In one embodiment, the marker 204 comprises a bar code (e.g., a Universal Product Code) or another optically readable tag. In another embodiment, the marker comprises a radio frequency identification tag (RFID). The marker 204 may be used to store information about the material, such as material attributes and attribute values. Alternately, the marker 204 may store a reference address, a computer address, a file name, or some other reference to more detailed or complete information about the harvest material. The duplicate marker may be embodied as the same format as the corresponding marker. However, a marker 204 is associated with the harvested material, whereas the duplicate marker of the marker 204 is in the possession of the harvester or associated with the harvester electronics (200).

After step S201, the method of FIG. 7 continues with steps S202, S204, and S208.

After step S208 in step S210, a preferential path plan may be presented to the operator of the forwarder via a user interface 101.

Figure 8:
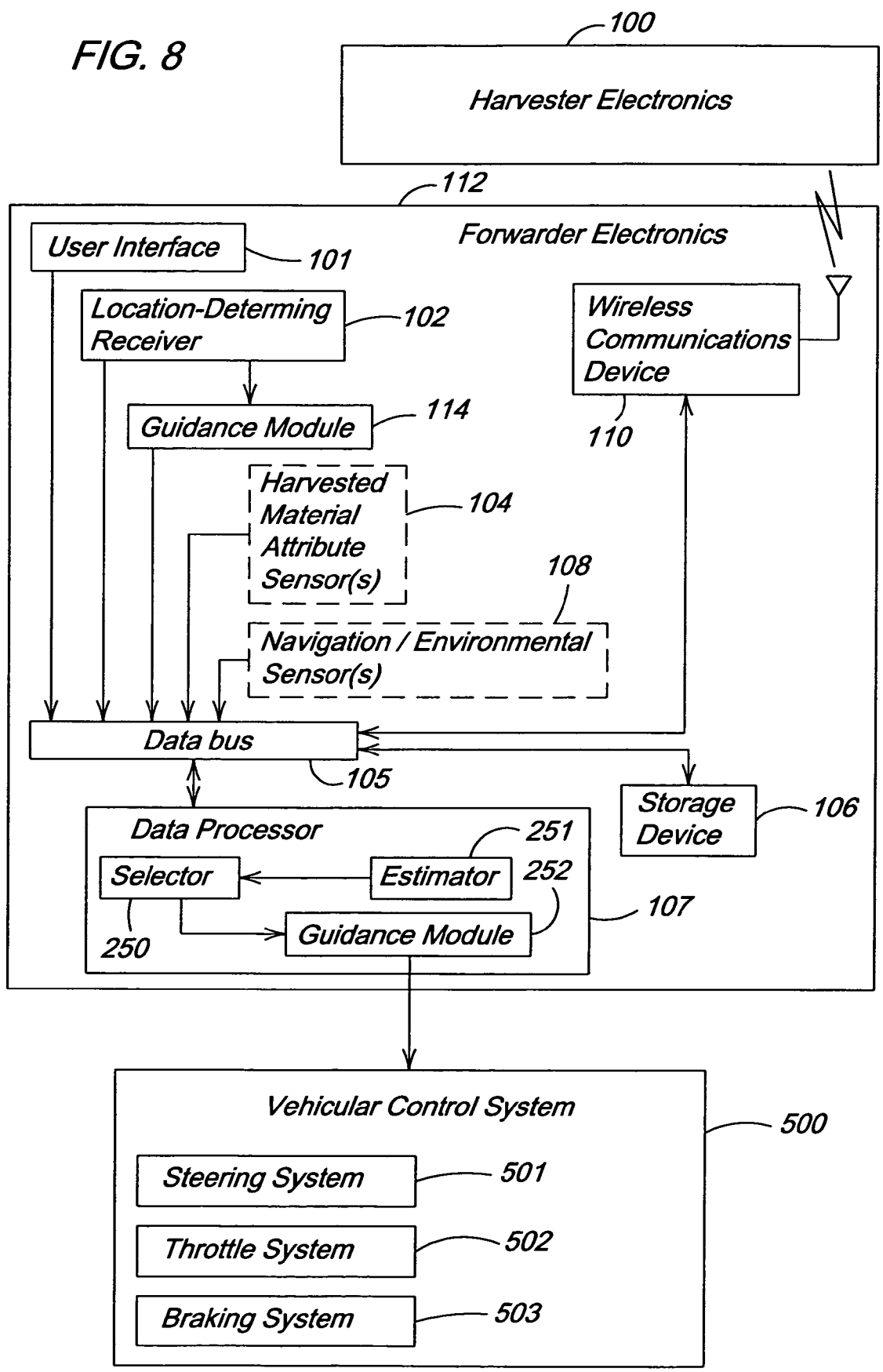
FIG. 8 is a block diagram of harvester electronics and forwarder electronics associated with an autonomous mode of operation.

FIG. 8 is similar to FIG. 1, except the forwarder of FIG. 8 is configured for autonomous or unmanned operation. Like reference numbers in FIG. 1 and FIG. 8 indicate like elements.

In an autonomous or unmanned configuration of the forwarder, the guidance module 252 is coupled to a vehicular control system 500. In one embodiment, the vehicular control system 500 comprises a steering system 501, a throttle control system 502, and a braking system 503 of the forwarder. The steering system 501 and braking system 503 may comprise electromechanical systems or hydraulic systems that are controlled by electrical or electronic controls. The throttle control 502 system may be associated with an electronic or mechanical fuel injection system for an internal combustion engine that propels the forwarder or a controller for controlling an electric motor that propels the forwarder.

Figure 9:
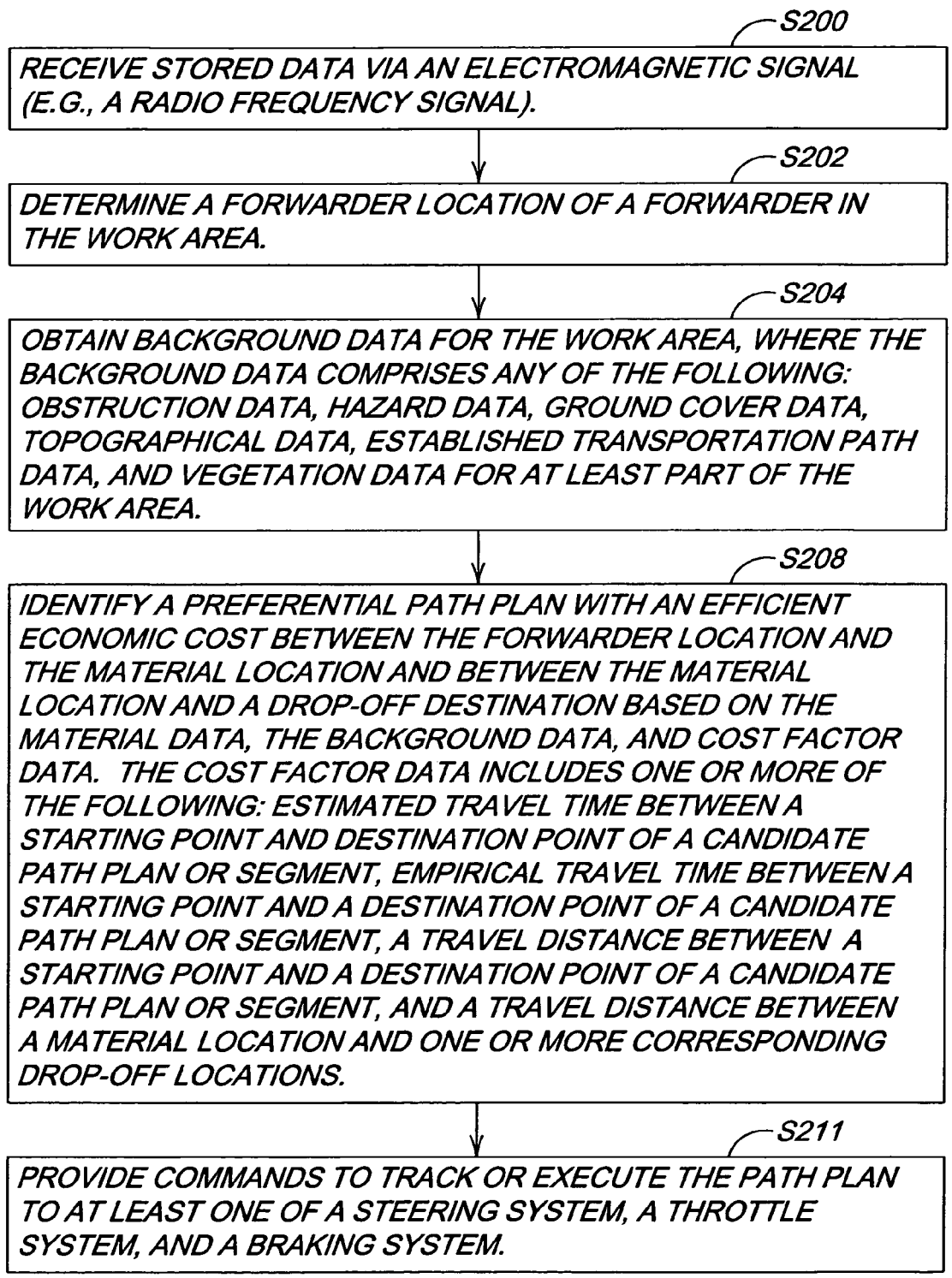
FIG. 9 is a flow chart of a method for determining a preferential path plan for an unmanned or autonomous work vehicle.

The method of FIG. 9 is similar to the method of FIG. 6, except the method of FIG. 9 replaces step S210 with step S211. The method of FIG. 9 applies where the forwarder is configured for autonomous or unmanned operation, consistent with FIG. 8 or otherwise.

In step S211, the guidance module 252 provides commands to track or execute the preferential path plan to at least one of a steering system 501, a throttle system 502, and a braking system 503 of the forwarder consistent with one or more segments of a preferential path plan. For instance, the guidance module 252 provides command data or command signals to the steering system 501, the throttle system 502, and the braking system 503 of the forwarder to track the established preferential path plan.

Figure 10:
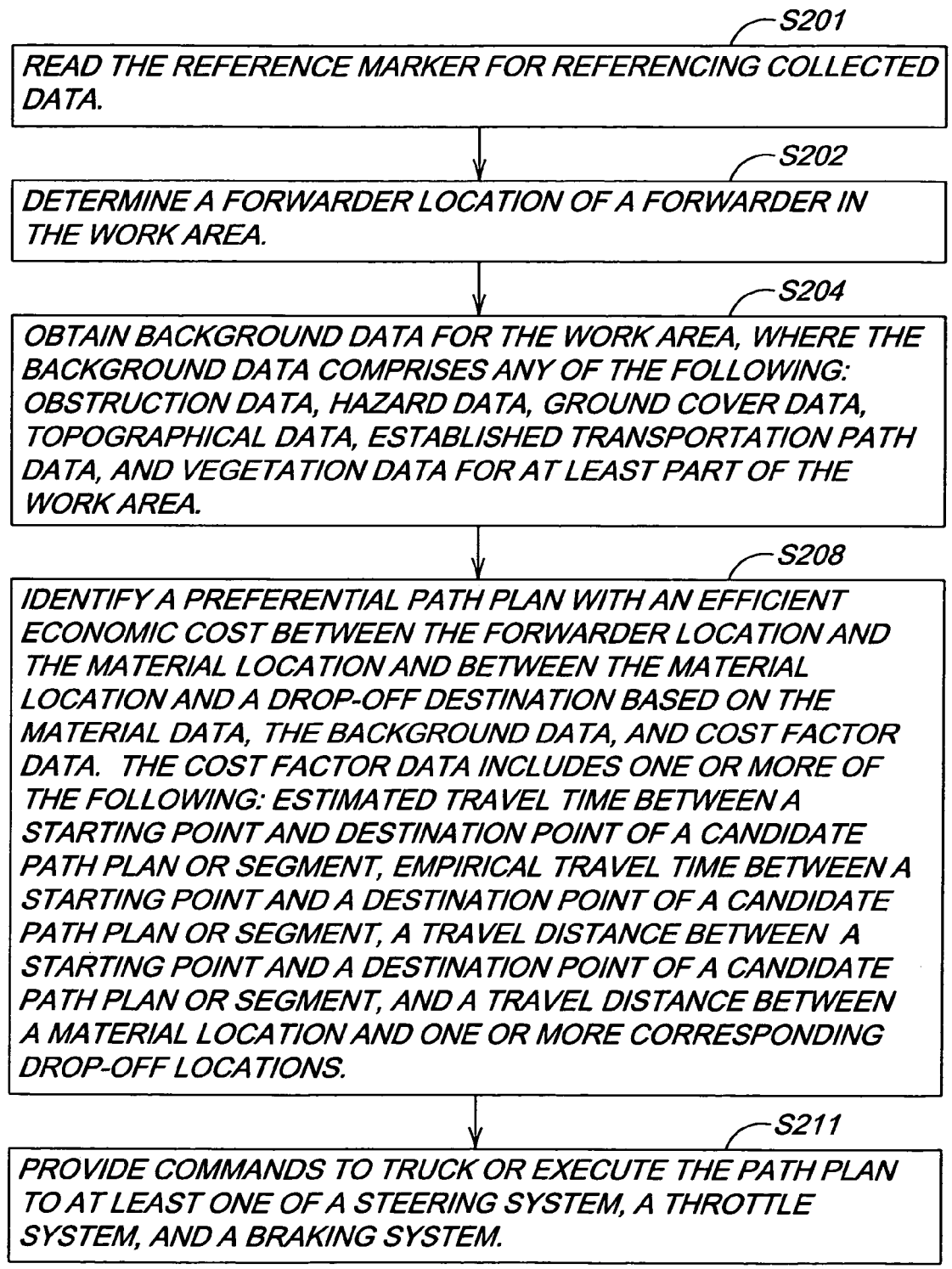
FIG. 10 is a flow chart of an alternate method for determining a preferential path plan for an unmanned or autonomous work vehicle.

The method of FIG. 10 is similar to the method of FIG. 7, except the method of FIG. 10 replaces step S210 with step S211. The method of FIG. 10 applies where the forwarder is configured for autonomous or unmanned operation, consistent with FIG. 8 or otherwise.

In step S211, the guidance module 252 provides commands to track or execute the preferential path plan to at least one of a steering system 501, a throttle system 502, and a braking system 503 of the forwarder consistent with one or more segments of a preferential path plan. For instance, the guidance module 252 provides command data or command signals to the steering system 501, the throttle system 502, and the braking system 503 of the forwarder to track the established preferential path plan.

Although other configurations fall within the scope of the invention and claims, in one configuration, the harvester is configured to harvest trees as the harvested material. The details of the following example may be applied to any of the foregoing methods or their constituent steps or procedures, disclosed in this document. Accordingly, harvester is equipped to collect information about the trees harvested or to be harvested. A location-determining receiver 102 (e.g., Global Positioning System (GPS) receiver) or another geo-position receiver may gather location data on the position of the harvester or the harvested trees. The collected information about the harvested trees includes location data, species, length, and quality attributes. Although the logs that are cut from a tree may be marked with a chemical or compound (e.g., ink) for identification purposes, in alternate embodiments, the harvested material (e.g., logs) may be marked or identified by bar code, radio frequency identification (RFID) tags or other identification devices.

The harvester transmits information either directly or indirectly to the forwarder. For example, the harvester may transmit the information to the forwarder via an electromagnetic signal This information includes the log information plus navigation information collected by the harvester such as natural open spaces at the work site, paths that have cleared by the harvester, obstacles, and traction or other surface conditions that affect the mobility of the harvester or forwarder. The forwarder may also be gathering some of the information itself. The information that the harvester gathers may be processed on the harvester before transmission, at an intermediate site, or on the forwarder. Information from third parties such as topography maps, aerial images, weather forecasts, and the like may also be processed with the data.

A forwarder may extract particular harvested material from a pile or other accumulation of harvested material based on the characteristics of the particular harvested material indicated by the transmission from the harvester, reading a bar code, a radio frequency identification tag or another indicia of the characteristics of the particular harvested material. For instance, individual logs of a preferential species may be pulled out of pile of harvested logs.

If the display of the user interface 101 is present on the forwarder, one or more of the following information may be displayed: (1) current positions of the forwarder and the harvester, and any other vehicles at the work site, (2) the clear space and obstacles identified by the harvester including any paths cleared by the harvester in the process of felling trees, (3) locations of logs ready for loading which may include information about the logs such as the number of each species, length or any other parameter(s) of interest, and (4) a recommended route or preferential path for picking up the logs and delivering the logs to a drop-off area.

The preferential path plan (e.g., recommended route) is intended to minimize the cost of picking upon the logs as defined by some cost function, table or other means. One cost function would be minimum distance to pick up and drop off the next load and a modified Dijkstra minimum-cost path algorithm could be used.

Dijkstra's algorithm refers to an algorithm to find a shortest path between a fixed vertex s to each vertex v in V.

First, set i=0, S0={u0=s}, L(u0)=0, and L(v)=infinity for v < >u0. If |V|=1, then stop; otherwise go to the second step.

Second, for each v in V\Si, replace L(v) by min{L(v), L(ui)+dvui}. If L(v) is replaced, put a label (L(v), ui) on v.

Third, find a vertex v which minimizes {L(v): v in V\Si}, say ui+1.

Fourth, let Si+1=Si cup {ui+1}.

Replace i by i+1. If i=|V|−1, then stop; otherwise go to the second step.

The processes used to generate the route may consider factors such as starting location of the forwarder, current location of the harvester, location and attributes of logs to be picked up, free space that the forwarder may use to move between log locations, estimated and empirical travel times and distances between log locations, locations of drop off points, and opportunity for other forwarders to better pick up logs.

The operator may use the preferential path plan (e.g., recommended route) to drive to logs, pick them up with the forwarder, and then deposit them at designated drop-off points. The preferential path plan (e.g., recommended route) may be updated continuously as the harvester(s) continue to fell trees or the route may be calculated once per round along a route that winds through the work area. If multiple forwarders are operating at the site, a central processor may determine the preferential path plan and then send them to the individual forwarders. This central processor may be located on-vehicle (e.g., on a forwarder), off-vehicle, on-site or off-site. For instance, the central processor determines the preferential path plan from the collected material data and background data collected by one or more harvesters and sends the determined preferential path plan to multiple forwarders operating in the work area to coordinate activities and avoid duplication of tasks of the forwarders, along with collision avoidance of the forwarders. Although the above example was described with reference to harvesting wood or trees as the harvested material, the harvested material may be defined in a prodigious assortment of ways.

The method and system may be applied to forwarding or picking up of any harvested material including, but not limited to, any the following: wood, logs, hay, grain, bulk material, grass clippings, leaves, crops, and other vegetation. The harvested material may be stored as a bale, a pile, clippings, a cord, a stack, in a grain cart, a cart or shipping container. The invention promotes increased forwarder productivity be allowing it to more efficiently travel to material pick-up sites and drop-off locations based on a prior site knowledge and knowledge gained by the vehicles at the worksite.

Having described the preferred embodiment, it will become apparent that various modifications can be made without departing from the scope of the invention as defined in the accompanying claims.

What is claimed is:

1. A data processing system implemented method for locating harvested material, the method comprising:
   receiving, by the data processing system, material data including material location data on a material location of unloaded harvested material within a work area, wherein the unloaded harvested material is unloaded from a harvester that harvested the harvested material;
   obtaining, by the data processing system, background data on at least one established transportation path within the work area;
   determining, by the data processing system, a forwarder location of a forwarder;
   estimating, by the data processing system, economic cost factors associated with corresponding candidate paths or segments of candidate paths between the forwarder location and the material location; and
   selecting, by the data processing system, a preferential path plan between the forwarder location and the material location consistent with the background data and minimization of the economic cost factors, wherein the material location of the unloaded harvested material is a different location than the forwarder location of the forwarder.

2. The method according to claim 1 further comprising:
   establishing a drop-off location for the unloaded harvested material;
   determining a path plan between the material location and the drop-off location.

3. The method according to claim 1 wherein the path plan comprises a shortest possible path that traverses at least one of a harvested area, an unharvested area, and a transportation path associated with the work area.

4. The method according to claim 3 further comprising receiving harvester data including harvester location data on a harvester location of a harvester within the work area, wherein the material location of the unloaded harvested material is a different location than the harvester location of the harvester, and wherein the material location and the harvested area is updated on a regular basis.

5. The method according to claim 1 wherein the unloaded harvested material comprises a material selected from the group consisting of grain, wood, cellulose, logs, and crops and the material is distinguished from one another by an optical sensor.

6. The method according to claim 1 wherein the material location is updated after the addition of a new material location.

7. The method according to claim 1 wherein the background data comprises transient data associated with at least one of a time-dependent location of a machine in the work area, a time-dependent location of a person within the work area, and a time-dependent definition of a harvested area associated with the work area, and wherein both the background data and the material data are specified by a user using a user interface of the data processing system.

8. The method according to claim 1 wherein selecting a preferential path plan further comprises considering environmental factors to reduce soil compaction from the forwarder.

9. The method according to claim 1 wherein selecting a preferential path plan further comprises considering vehicle dynamic constraints related to the handling and maneuvering capabilities of the forwarder that is transporting a certain corresponding level of a load of the harvested material.

10. A data processing system implemented method for locating harvested material, the method comprising:
collecting, by the data processing system, material data including at least one of material location data, a material identifier, a material attribute, and a material attribute value, wherein the material location data, the material identifier, the material attribute, and the material attribute value are each associated with the harvested material;
obtaining, by the data processing system, background data for the work area;
storing, by the data processing system, the collected material data and the obtained background data;
making available the stored data to a forwarder;
receiving the stored data via an electromagnetic signal;
determining a forwarder location of the forwarder in the work area;
identifying a preferential path plan with an efficient path cost between the forwarder location and a material location and between the material location and the drop-off destination based on the stored data, including the material data and the background data, and based on cost factor data, wherein the material location is a location of the harvested material unloaded from a harvester that harvested the harvested material.

11. The method according to claim 10 wherein the collected material data is stored in response to unloading the harvested material from the harvester, and wherein the making available comprises transmitting the stored data from the harvester directly to the forwarder via an electromagnetic signal that the harvester transmits to the forwarder.

12. The method according to claim 10 wherein the obtaining background data comprises obtaining obstruction data, hazard data, ground cover data, topographical data, established transportation route data, established transportation path data, and vegetation data for at least part of the work area.

13. The method according to claim 10 wherein the obtaining background data comprises (i) obtaining static data and transient data as the background data, wherein the static data remains generally constant over a greater sample period and wherein the transient data tends to vary over the greater sample period, and (ii) providing a user interface that allows a user to override the background data that is obtained.

14. A data processing system implemented method for facilitating locating harvested material, the method comprising:
collecting, by the data processing system, material data including at least two of material location data, a material identifier, a material attribute, and a material attribute value, wherein the material location data, the material identifier, the material attribute, and the material attribute value are each associated with the harvested material, and wherein the harvested material is material that has been unloaded from a harvester that harvested the material; and
marking the harvested material with a marker for referencing the collected material data, wherein the marker is at least one of a bar code, a uniform product code (UPC), an optical code, a radio frequency identification tag, an optical tag, and a tag, and the marker is usable to locate the harvested material that has been unloaded from the harvester.

15. The method according to claim 14, further comprising reading the marker associated with the harvested material by a forwarder that includes forwarder electronics.

16. The method according to claim 10 further comprising:
obtaining background data via forwarder electronics for supplementing, augmenting or replacing the stored background data.

17. The method according to claim 10 further comprising:
presenting the preferential path plan to the operator via a user interface.

18. The method according to claim 10 wherein the cost factor data comprises one or more of the following items: estimated travel time between a starting point and a destination point of a candidate path plan or segment, empirical travel time between a starting point and a destination point of candidate path plan or segment, a travel distance between a starting point and a destination point of a candidate path plan or segment, and a travel distance between the material location and one or more corresponding drop-off locations.

19. The method according to claim 14 further comprising:
reading the marker for referencing the stored data;
determining, in response to the reading of the marker, a forwarder location of a forwarder in the work area;
identifying a preferential path plan with an efficient path cost between the forwarder location and a material location of the harvested material that has been unloaded from the harvester and between the material location and the drop-off destination based the stored data, including material data and background data, and based on cost factor data.

20. The method according to claim 19 further comprising:
obtaining background data via forwarder electronics for supplementing, augmenting or replacing the stored background data.

21. The method according to claim 19 further comprising:
presenting the preferential path plan to the operator.

22. The method according to claim 19 wherein the cost factor data comprises one or more of the following items: estimated travel time between a starting point and a destination point of a candidate path plan or segment, empirical travel time between a starting point and a destination point of candidate path plan or segment, a travel distance between a starting point and a destination point of a candidate path plan or segment, and a travel distance between the material location and one or more corresponding drop-off locations.

23. A system for locating harvested material in a work area, the system comprising:
a harvested material attribute sensor for collecting material data including at least two of material location data, a material identifier, a material attribute, and a material attribute value, wherein the material location data, the material identifier, the material attribute, and the material attribute value are each associated with the harvested material;
a navigational/environmental sensor for obtaining background data for the work area;
a storage device for storing the collected material data and the obtained background data; and
a wireless communications device for making available the stored data to a forwarder, wherein the material location data indicates a material location of harvested material unloaded from a harvester that harvested the harvested material.

24. The system according to claim 23 further comprising:
another wireless communications device for receiving the stored data via an electromagnetic signal;
a location-determining receiver for determining a forwarder location of a forwarder in the work area; and
a data processor for identifying a preferential path plan with an efficient path cost between the forwarder location and the material location of the harvested material unloaded from the harvester and between the material location and the drop-off destination based the stored data, including the material data and the background data, and based on cost factor data.

25. The system according to claim 23 further comprising:
a reading device reading a marker for referencing the stored data, wherein the marker is associated with the harvested material that is unloaded from the harvester;
another location-determining receiver for determining a forwarder location of a forwarder in the work area;
a data processor for identifying a preferential path plan with an efficient path cost between the forwarder location and the material location of the harvested material unloaded from the harvester and between the material location and the drop-off destination based the stored data, including material data and background data, and based on cost factor data.

26. The system according to claim 23 wherein the data processor further comprises:
an estimator for estimating economic cost factors associated with corresponding candidate paths or segments of candidate paths between the forwarder location and the material location; and
a selector for selecting a preferential planned path between the forwarder location and the material location consistent with the transient data, the background data, and minimization of the economic cost factors.

27. The system according to claim 26 wherein the data processor further comprises a guidance module for presenting guidance information on the selected preferential path plan to a user via a user interface.

28. The system according to claim 23 further comprising a user interface for entering the material data to supplement or complement an output of the harvested material attribute sensor.

29. The system according to claim 23 further comprising:
a central processor determining the preferential path plan from the collected material data and background data collected by one or more harvesters and sending the determined preferential path plan to a plurality of forwarders operating in the work area.

* * * * *